United States Patent
Dao et al.

(10) Patent No.: US 7,091,160 B2
(45) Date of Patent: Aug. 15, 2006

(54) METHODS AND COMPOSITIONS FOR REDUCING SUBTERRANEAN FORMATION PERMEABILITIES

(75) Inventors: Bach Dao, Nieuw-vennep (NL); Marco Verlaan, Rotterdam (NL); Ron Bouwmeester, Oude Wetering (NL); Ewout Biezen, Leiderdorp (NL); B. Raghava Reddy, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/875,649

(22) Filed: Jun. 24, 2004

(65) Prior Publication Data

US 2005/0288190 A1    Dec. 29, 2005

(51) Int. Cl.
*C09K 8/487* (2006.01)

(52) U.S. Cl. .......... 507/224; 507/221; 507/211; 507/239; 507/269; 507/271; 507/272; 507/903; 166/285; 166/295; 166/300

(58) Field of Classification Search .......... 507/224, 507/221, 211, 239, 269, 271, 272, 903; 166/285, 166/293, 300
See application file for complete search history.

(56) References Cited

U.S. PATENT DOCUMENTS

| | | | |
|---|---|---|---|
| 3,762,476 A * | 10/1973 | Gall | 166/294 |
| 4,498,539 A * | 2/1985 | Bruning | 166/294 |
| 4,498,540 A * | 2/1985 | Marrocco | 166/295 |
| 4,643,255 A * | 2/1987 | Sandiford et al. | 166/295 |
| 4,664,194 A * | 5/1987 | Marrocco | 166/295 |
| 4,773,481 A * | 9/1988 | Allison et al. | 166/270 |
| 4,796,700 A * | 1/1989 | Sandiford et al. | 166/270 |
| 4,917,186 A * | 4/1990 | Mumallah | 166/295 |
| 4,934,456 A * | 6/1990 | Moradi-Araghi | 166/270 |
| 5,219,476 A * | 6/1993 | Lockhart et al. | 507/225 |
| 5,277,830 A * | 1/1994 | Hoskin et al. | 507/213 |
| 5,338,465 A * | 8/1994 | Lockhart et al. | 507/244 |
| 5,421,411 A * | 6/1995 | Sydansk | 166/295 |
| 5,431,226 A * | 7/1995 | Sydansk | 166/295 |
| 5,478,802 A * | 12/1995 | Moradi-Araghi | 507/203 |
| 5,609,208 A * | 3/1997 | Sydansk | 166/295 |
| 5,650,379 A * | 7/1997 | Sydansk | 507/271 |
| 6,176,315 B1 * | 1/2001 | Reddy et al. | 166/295 |
| 6,194,356 B1 * | 2/2001 | Jones et al. | 507/225 |
| 6,196,317 B1 * | 3/2001 | Hardy | 166/295 |
| 6,838,417 B1 * | 1/2005 | Bouwmeester et al. | 507/203 |
| 2003/0092584 A1 * | 5/2003 | Crews | 507/200 |
| 2003/0119678 A1 * | 6/2003 | Crews | 507/100 |
| 2004/0035580 A1 * | 2/2004 | Bouwmeester et al. | 166/295 |

* cited by examiner

Primary Examiner—Philip C. Tucker
(74) Attorney, Agent, or Firm—Robert A. Kent; Baker Botts

(57) ABSTRACT

Methods and compositions for reducing the permeabilities of subterranean formations or zones are provided. The methods of the invention are basically comprised of introducing an aqueous composition into the formation or zone comprised of water, a water soluble organic polymer, an organic gelling agent for cross-linking the organic polymer and a gel retarder comprised of a chemical compound that hydrolyzes or thermolyzes to produce one or more acids in the composition and then allowing the aqueous composition to form a cross-linked gel in the formation or zone.

43 Claims, 3 Drawing Sheets

METHODS AND COMPOSITIONS FOR REDUCING SUBTERRANEAN FORMATION PERMEABILITIES

BACKGROUND OF THE INVENTION

1. Field of the Invention

The present invention relates to methods and compositions for reducing the permeabilities of subterranean formations or zones penetrated by well bores.

2. Description of the Prior Art

When wells penetrating hydrocarbon producing formations or zones are produced, water often accompanies the hydrocarbons, particularly as the wells mature in time. The water can be the result of a water producing zone communicated with the hydrocarbon producing formations or zones by fractures, high permeability streaks and the like, or the water can be caused by a variety of other occurrences which are well known to those skilled in the art such as water coning, water cresting, bottom water, channeling at the well bore, etc. It becomes an economic necessity to reduce the water production such that recovery of remains cost effective.

In enhanced recovery techniques such as water flooding, an aqueous flood or displacement fluid is injected under pressure into oil containing subterranean formations or zones by way of one or more injection wells. The flow of the aqueous fluid through the formations or zones displaces hydrocarbons contained therein and drives them to one or more producing wells. However, the aqueous displacement fluid often flows through the most permeable formations or zones whereby less permeable formations or zones containing hydrocarbons are bypassed. This uneven flow of the aqueous displacement fluid through the formations or zones reduces the overall yield of hydrocarbons therefrom. Heretofore, enhanced recovery problems in subterranean hydrocarbon containing formations or zones caused by permeability variations therein have been corrected by reducing the permeabilities of the subterranean flow paths having high permeabilities and low hydrocarbon content. As a result, the subsequently injected aqueous displacement fluid is forced through flow paths having low permeability and high hydrocarbon content. The techniques utilized to accomplish this high flow path permeability reduction, referred to in the art as "conformance control techniques", have included injecting aqueous solutions of polymers and gelling agents into the high permeability flow paths whereby the polymers are gelled and cross-linked therein. For example, water soluble polymers including copolymers of acrylamide and acrylic acid cross-linked with transition metal ions have been utilized heretofore. However, when such fluids are utilized in subterranean formations or zones having temperatures above about 200° F., the cross-linkers containing metals or the polymers become unstable. This has resulted in uncontrolled cross-linking rates which cause cross-linker precipitation, polymer degradation, etc. While other non-metal cross-linking agents have been developed and used, they have also suffered from very rapid cross-linking at temperatures above about 200° F. and instability problems brought about thereby. As a result of the short cross-linking times of the conformance control polymers and gelling agents utilized heretofore in high temperature formations or zones, it has been common practice to cool the formations or zones such as by injecting water into the formations or zones prior to introducing the conformance control polymer and cross-linking gelling agent therein. While cooling the subterranean formations or zones has allowed successful placement by injection conformance control, the cool down process is time consuming and expensive to carry out.

Thus, there are needs for improved methods and compositions for reducing the permeabilities of subterranean formations or zones without the requirement of cooling the subterranean formations or zones prior to introducing conformance control displacement fluids therein.

SUMMARY OF THE INVENTION

The present invention provides methods and compositions for reducing the permeabilities of subterranean zones at high temperatures which meet the needs described above and overcome the deficiencies of the prior art. The methods of the present invention for reducing the permeability of subterranean formations or zones having temperatures above about 200° F. are basically comprised of the following steps.

An aqueous composition comprised of water, a water soluble organic polymer, an organic gelling agent for cross-linking the organic polymer and a gel retarder comprised of a chemical compound that is capable of acetylating an organic amine and/or hydrolyzing or thermolyzing to produce one or more acids in the composition is introduced into the formation or zone. Thereafter, the aqueous composition is allowed to form a cross-linked gel in the formation or zone.

The gel retarder of this invention that produces one or more acids in the aqueous composition functions to delay the rapid cross-linking of the composition at high temperatures. In order to further delay the cross-linking rate of the copolymer by the gelling agent, the copolymer can be stabilized so that it does not cross-link as rapidly at high temperatures by proper selection of monomers to form a copolymer, a terpolymer or a tetrapolymer.

The compositions of this invention are basically comprised of water, a water soluble organic polymer, an organic gelling agent for cross-linking the organic polymer and a gel retarder comprised of a chemical compound that is capable of acetylating an organic amine and/or hydrolyzing or thermolyzing to produce one or more acids in the composition such as a polyacid, ester, amide, imide or anhydride the like.

The objects, features and advantages of the present invention will be readily apparent to those skilled in the art upon a reading of the description of preferred embodiments which follows when taken in conjunction with the accompanying drawings.

DESCRIPTION OF PREFERRED EMBODIMENTS

Figure 1:
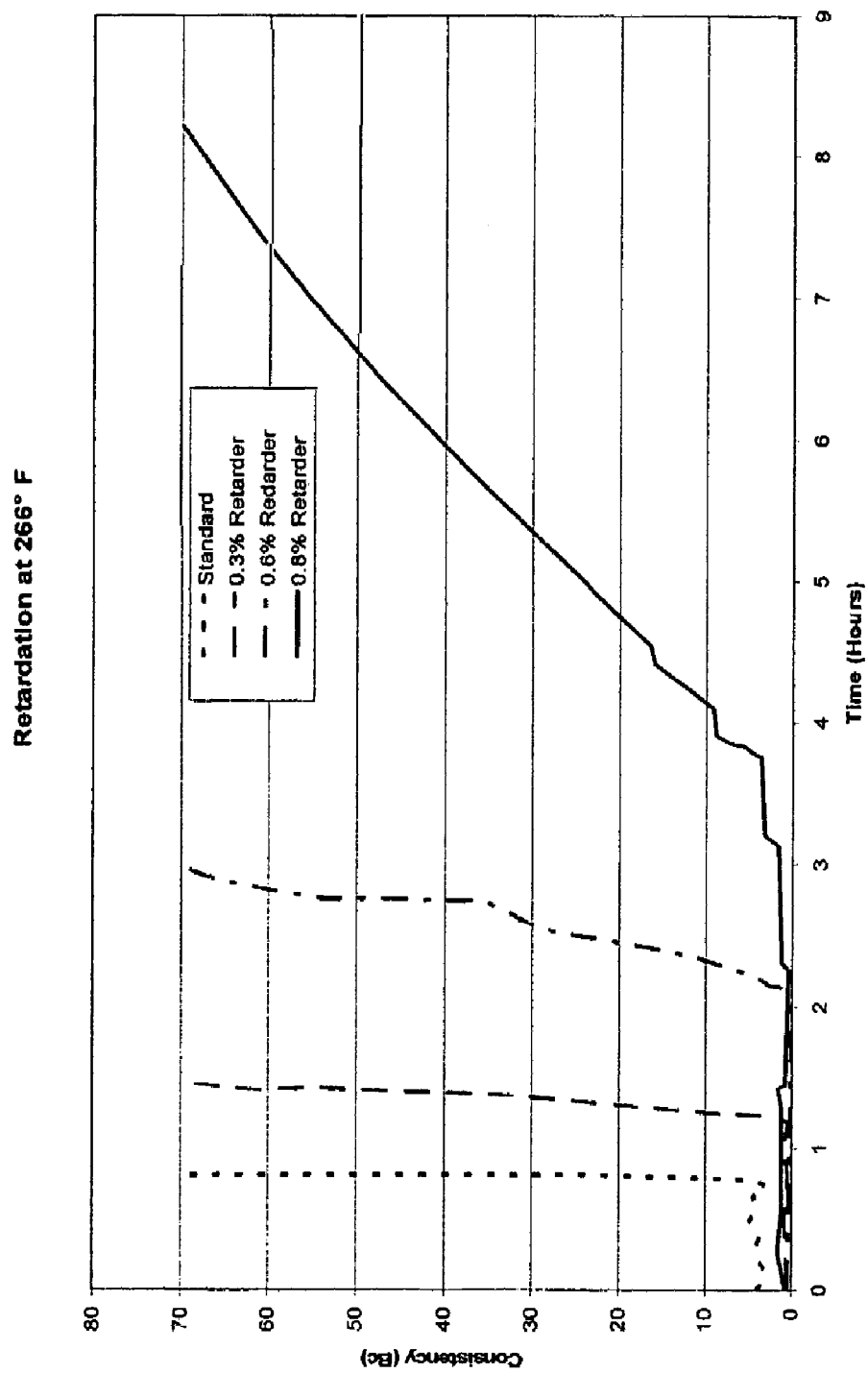
FIG. 1 is a graph of viscosity vs. time for an aqueous polymer composition of this invention containing various amounts of polysuccinimide gel retarder at 266° F.

As mentioned, the methods of this invention for reducing the permeability of a subterranean formation or zone having a temperature above about 200° F. are comprised of the following steps. An aqueous composition is introduced into the formation or zone comprised of water, a water soluble organic polymer, an organic gelling agent for cross-linking the organic polymer and a gel retarder comprised of a chemical compound that is capable of acetylating an organic amine and/or hydrolyzing or thermolyzing to produce one or more acids in the composition. Thereafter, the aqueous composition is allowed to form a cross-linked gel in the formation or zone.

The compositions of the invention are as described above. The water in the compositions can be water from any source so long as it does not adversely react with other components of the compositions. Generally, the water can be fresh water, water containing various amounts of one or more salts, brine produced from subterranean formations or seawater.

The water soluble organic polymers useful in the compositions of this invention can be copolymers, terpolymers or tetrapolymers. The copolymers which are useful in accordance with the invention are formed from at least one ethylenically unsaturated polar monomer and at least one ethylenically unsaturated ester. The ethylenically unsaturated polar monomer may be derived from an unsaturated carboxylic acid wherein the unsaturated group is vinyl or alpha-methyl vinyl. The polar monomer formed from the acid is non-acidic and is preferably a primary, secondary or tertiary amide of the unsaturated carboxylic acid. The amide can be derived from ammonia or a primary or secondary alkylamine, e.g., an alkylamine having from 1 to 10 carbon atoms which may also be substituted by at least one hydroxyl group. That is, the amide of the acid can be an alkylolamide such as ethanolamide. Examples of suitable ethylenically unsaturated polar monomers are acrylamide, methacrylamide and acrylic ethanol amide. The ethylenically unsaturated polar monomer may also be a vinyl heterocyclic compound with at least an oxygen, sulfur or nitrogen atom in a ring with 3 to 8 carbon atoms, such as one with at least one carbonyl group in the ring, e.g., N-vinylpyrrolidone, caprolactam or a vinylpyridine.

The ethylenically unsaturated esters which can be used with the ethylenically unsaturated polar monomer described above to form a copolymer are formed from a hydroxyl compound and an ethylenically unsaturated carboxylic acid. The ethylenically unsaturated group is preferably in the alpha to beta or the beta to gamma position relative to the carboxyl group. Preferred acids have in the range of from about 3 to about 20 carbon atoms. Examples of these acids are acrylic acid, methacrylic acid, crotonic acid and cinnamic acid.

The hydroxyl compound is preferably an alcohol of the formula ROH, wherein R is a hydrocarbyl group. Preferred hydrocarbyl groups are alkyl groups having from 1 to 30 carbon atoms, alkenyl groups having from 2 to 20 carbon atoms, cycloalkyl groups having from 5 to 8 carbon atoms, aryl groups such as aromatic hydrocarbyl groups having from 6 to 20 carbon atoms and arylalkyl groups having from 7 to 24 carbons atoms. Specific examples of R groups are methyl, ethyl, propyl, butyl, amyl, hexyl, octyl, 2-ethylhexyl and decyl (including all stereoisomers), allyl, cyclohexyl, palmityl, stearyl, phenyl and benzyl. The R group may also be a hydrocarbyl group substituted by at least one, e.g., from 1 to 3 substituents, such as hydroxyl, ether and thioether groups. Electron donating group substituents are preferred. Ether substituents are also preferred, especially alkoxy, aryloxy and arylalkoxy in which the alkyl, aryl and arylalkyl groups may be as described above. Preferably, the substituent is on the same carbon atom of the group as is bonded to the hydroxyl group in the hydroxyl compound with alkoxymethyl and arylalkyloxy methyl groups being preferred. The hydroxyl compound may be a primary, secondary, iso or tertiary compound, preferably with a tertiary carbon atom bonded to the hydroxyl group, e.g., tert-butyl and trityl. The R group may also comprise a heterocyclic group either for bonding directly to the hydroxyl group of ROH or separated therefrom by an alkylene group having from 1 to 4 carbon atoms such as methylene. Thus, the R group may be a saturated or unsaturated heterocyclic or heterocyclic alkylene group, e.g., having 3 to 8 carbon atoms and at least 1 or 2 ring heteroatoms selected from oxygen, nitrogen and sulfur. Examples of such groups are furyl, tetrahydrofuryl, furfuryl, tetrahydrofurfuryl, pyranyl and tetrahydropyranyl. Preferred R groups are tert-butyl, trityl, methoxymethyl, benzyloxymethyl and tetrahydropyranyl. Other less preferred R groups include stearyl, isopropyl, ethyl and methyl. The most preferred ester is a t-butyl ester.

The copolymer can contain from about 50 to about 99.99 mole % of the polar monomer and from about 0.1 to about 50 mole % of the ester monomer. More preferably, the polar monomer is present in the copolymer in an amount of about 85 to about 95 mole % with the ester monomer being present in an amount of from about 5 to about 15 mole %. The copolymer may be a block or non-block copolymer, a regular or random copolymer or a graft copolymer whereby the ester units are grafted onto a polymerized polar monomer, e.g., the ester grafted onto polyacrylamide.

The copolymer is preferably soluble in water to the extent of at least 1 gram per liter in distilled water at 15° C. and 1.0 grams per liter in an aqueous sodium chloride solution containing 32 grams per liter of sodium chloride at 25° C. If desired, the copolymer can be mixed with a surfactant to facilitate its solubility in the water or salt solution utilized. The copolymer can have an average molecular weight in the range of from about 50,000 to 20,000,000, most preferably from about 100,000 to about 500,000. A copolymer having an average molecular weight of about 50,000 has a viscosity when dissolved in distilled water in the amount of about 3.6% by weight of the solution at 19° C. of from about 10 to about 500 centipoises. Preferably, the copolymer is shear thinnable whereby the viscosity reduces by at least 10% on increasing shear rate by 10%. The copolymer can be produced by conventional methods for copolymerizing ethylenically unsaturated monomers in solution, emulsion or suspension.

The organic gelling agents suitable for use in cross-linking the above described copolymer can be a polyalkyleneimine, a polyfunctional aliphatic amine, an aralkylamine or a heteroaralkylamine. Examples of polyalkyleneimines which can be used include, but are not limited to, a polymerized ethyleneimine or a polymerized propyleneimine. Examples of polyfunctional aliphatic amines include, but are not limited to, polyethylene polyamine or polypropylenepolyamine, polyvinylainine, polyallylamine, poly(vinylalcohol/vinylamine), chitosan and its derivatives, polylysine, polymyxin and combinations there of. Of the various organic gelling agents which can be utilized, polyalkyleneimine are generally preferred.

As mentioned above, the gel retarder is comprised of a chemical compound that is capable of acetylating an organic amine and/or slowly hydrolyzing or thermolyzing to produce one or more acids in the aqueous polymer composition. The compounds retard the cross-linking of the gelled polymer composition at high temperatures, i.e., temperatures above about 200° F., for a period of time sufficient to place the polymer composition in the subterranean formation or zone in which the permeability is to be reduced.

Examples of gel retarder chemical compounds that is capable of acetylating an organic amine and/or slowly hydrolyzing or thermolyzing to produce one or more acids that can be utilized in accordance with the present invention include, but are not limited to, anhydrides such as acetic or propionic anhydride, esters such polylactate, amides such as proteins and polyamides, imides such as polysuccinimide, polyacids such as polyaspartic acid polyglutamic acids and their salts. Of these, polysuccinimide or polyaspartic acid are preferred. Polysuccinimide hydrolyzes or thermolyzes in water to produce iminodisuccinic acid, polyaspartic acid or aspartic acid.

The water soluble organic polymer utilized is generally present in the aqueous polymer composition of this invention in an amount in the range of from about 0.05% to about 10% by weight of water in the composition, most preferably in an amount of 0.05 to about 5%. The organic gelling agent for cross-linking the organic polymer is generally present in the aqueous polymer composition in an amount in the range of from about 0.001% to about 5% by weight of water in the composition, most preferably in an amount of about 0.001 to about 1%, and the gel retarder is generally present in the aqueous polymer composition in an amount in the range of from about 0.1% to about 5% by weight of water in the composition, most preferably in an amount of about 0.3 to about 3%.

In order to aid the gel retarder in slowing down the cross-linking of the polymer composition and increase its gel strength after it is fully cross-linked, a terpolymer or tetrapolymer instead of the above described copolymer can be utilized in the composition. That is, a terpolymer or tetrapolymer of the above described polar monomer, the above described ester, bulky monomers such as 2-acrylamido-2-methylpropane sulfonic acid (AMPS® monomer) and/or N-vinylpyrrolidone and/or N,N-dimethylacrylamide can be substituted for the above described copolymer. The terpolymer can contain from about 1 to about 98.9 mole % of the polar monomer, from about 0.01 to about 50 mole % of the ester and from about 1 to about 40 mole % of the AMPS® monomer or N-vinylpyrrolidone or N,N-dimethylacrylamide monomer. The tetrapolymer can contain from about 50 to about 97.9 mole % of the polar monomer, from about 0.01 to about 50 mole % of the ester, from about 1 to about 20 mole % of AMPS® monomer and from about 1 to about 20 mole % of N-vinylpyrrolidone or N,N-dimethylacrylamide. The terpolymer or tetrapolymer can be a block or a non-block regular random polymer or a graft polymer. Also the solubility, molecular weight, viscosity, production and other properties of the terpolymer or tetrapolymer should generally be as described above for the copolymer. The organic gelling agents for cross-linking the terpolymer or tetrapolymer can be the same as those described above for the copolymer. However, metal ion chelated water-soluble polymers capable of cross-linking the copolymer, terpolymer and tetrapolymer described above can be utilized to add to the delay in cross-linking the polymers provided by the gel retarder described above. Particularly suitable water-soluble polymeric gelling agents are chelated polyethylene imines and polypropylene imines. Of these, chelated polyethylene imine is the most preferred. The metal ion utilized to chelate the organic gelling agent can be selected from the group consisting of zirconium (IV) ion, cobalt (II or III) ion, nickel (II) ion, ferric ion, titanium (IV) ion and copper (II) ion. Of these, zirconium (IV) ion is the most preferred. The amounts of the terpolymer, tetrapolymer and chelated cross-linking gelling agent are essentially the same as those described above for the polymer composition utilizing the copolymer and a non-chelated gelling agent described above.

A preferred method of this invention for reducing the permeability of a subterranean formation or zone having a temperature above about 200° F. is comprised of the steps of: (a) introducing an aqueous composition into the formation or zone comprised of water, a water soluble organic polymer, an organic gelling agent for cross-linking the organic polymer and a gel retarder comprised of a chemical compound that hydrolyzes or thermolyzes to produce one or more acids in the composition; and (b) allowing the aqueous composition to form a cross-linked gel in the formation or zone.

Another method of reducing the permeability of a subterranean formation or zone having a temperature above about 200° F. comprises the steps of: (a) introducing an aqueous composition into the formation or zone comprised of water, a water soluble organic copolymer formed of an ethylenically unsaturated polar monomer comprised of an amide of an unsaturated carboxylic acid and an ethylenically unsaturated ester comprised of t-butyl acrylate; and (b) allowing the aqueous composition to form a cross-linked gel in the formation or zone.

As mentioned above, the water soluble organic polymer can be a copolymer, a terpolymer or a tetrapolymer. The copolymer can be comprised of an ethylenically unsaturated polar monomer and an ethylenically unsaturated ester. The terpolymer can be the same as the copolymer with the addition of a monomer selected from the group consisting of AMPS® monomer, N-vinylpyrrolidone and N,N-dimethylacrylamide. The tetrapolymer can be the same as the copolymer with the addition of both AMPS® monomer and N-vinylpyrrolidone monomers. The ethylenically unsaturated polar monomer in the terpolymer or tetrapolymer is preferably an amide of an unsaturated carboxylic acid. such as acrylamide and the ethylenically unsaturated ester is preferably t-butyl acrylate. As also mentioned above, the organic gelling agent can be chelated to provide an additional delay in the cross-linking of the organic polymer utilized.

A preferred composition of this invention for reducing the permeability of a subterranean formation or zone having a temperature above about 200° F. comprises: water; a water soluble organic polymer; an organic gelling agent for cross-linking the organic polymer; and a gel retarder comprised of a chemical compound that hydrolyzes or thermolyzes to produce one or more acids in the composition.

Another preferred composition for reducing the permeability of a subterranean formation or zone having a temperature above about 200° F. comprises: water, a water soluble organic copolymer formed of an ethylenically unsaturated polar monomer comprised of an amide of an unsaturated carboxylic acid and an ethylenically unsaturated ester comprised of a hydroxyl compound and an ethylenically unsaturated carboxylic acid and a gel retarder selected from the group consisting of polysuccinimide, and polyaspartic acid.

Yet another composition for reducing the permeability of a subterranean formation or zone having a temperature above about 200° F. comprises: water; a water soluble organic polymer selected from the group consisting of a copolymer of acrylamide and t-butyl acrylate, a terpolymer comprised of acrylamide, t-butyl acrylate and AMPS® monomer and the tetrapolymer comprised of acrylamide, t-butyl acrylate, AMPS® monomer and N-vinylpyrrolidone;

an organic gelling agent for cross-linking the organic polymer selected from the group consisting of polyethyleneimine and polyethyleneimine chelated with zirconium ion; and a gel retarder comprised of polyaspartic acid.

While the specific mechanism remains uncertain, it is believed the delayed gellation is caused by a reaction of the gelling agent for cross-linking the polymer with the gel retarder. The gel retarder reacts with the amine in the cross-linking agent in a faster manner than the thermodynamic hydrolysis reaction at the surface temperatures such that the reaction is kinetically favored over the thermodynamic reaction of the gel retarder which occurs upon heating to an elevated temperature in the subterranean formation. As the fluid is heated upon introduction into the subterranean formation, the cross-linking agent is released or regenerates as the thermodynamic reaction is now favored and the gelling agent then functions to cross-link the polymer to form a high viscosity immobile gel within the formation.

In order to further illustrate the methods and compositions of this invention, the following examples are given.

To illustrate the effect of the gel retarder upon the gelling agent and polymer of the present invention the following tests were performed. A base fluid was prepared by mixing water with 250 gallons/1000 gallons of fluid of a commercially available polymer identified as HZ-10 which is available from Halliburton Energy Services, Inc. of Houston, Tex. comprising a copolymer of acrylamide and t-butyl acrylate with a gelling agent identified as HZ-20 which is also available from Halliburton Energy Services, Inc. comprising a polyethyleneimine. The base fluid was separated into a number of samples into which various quantities of a gel retarder comprising polysuccinimide was added. The retarder was added in an amount to provide the designated quantity in a percent by weight of aqueous in the fluid.

Figure 2:
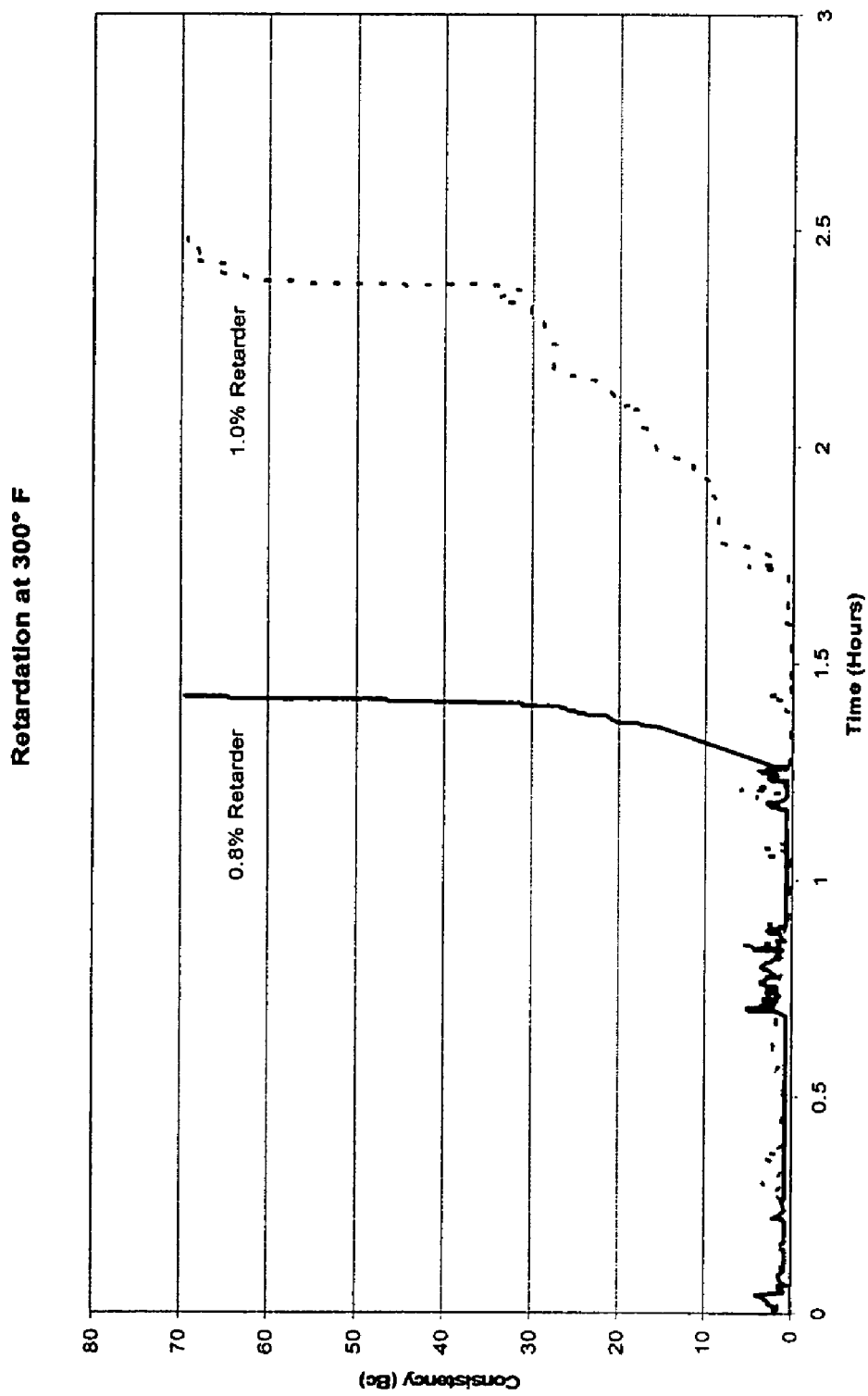
FIG. 2 is a graph of viscosity vs. time for an aqueous polymer composition of this invention containing various amounts of polysuccinimide gel retarder at 300° F.

The samples were individually placed in a test cell in a high temperature, elevated pressure consistomer and the time for substantial development of fluid viscosity was determined. The tests were performed at 266 and 300° F. The results of the tests are set forth in FIGS. 1 and 2. The standard test was a sample of the based fluid with no retarder. The substantial rise in the consistency of the fluid after about 45 minutes at 266° F. indicates that the fluid was rapidly cross-linking and becoming immobile in the test cell. The results of the tests clearly indicate that the gel retarder was able to substantially delay the onset of cross-linking between the polymer and the gelling agent.

Figure 3:
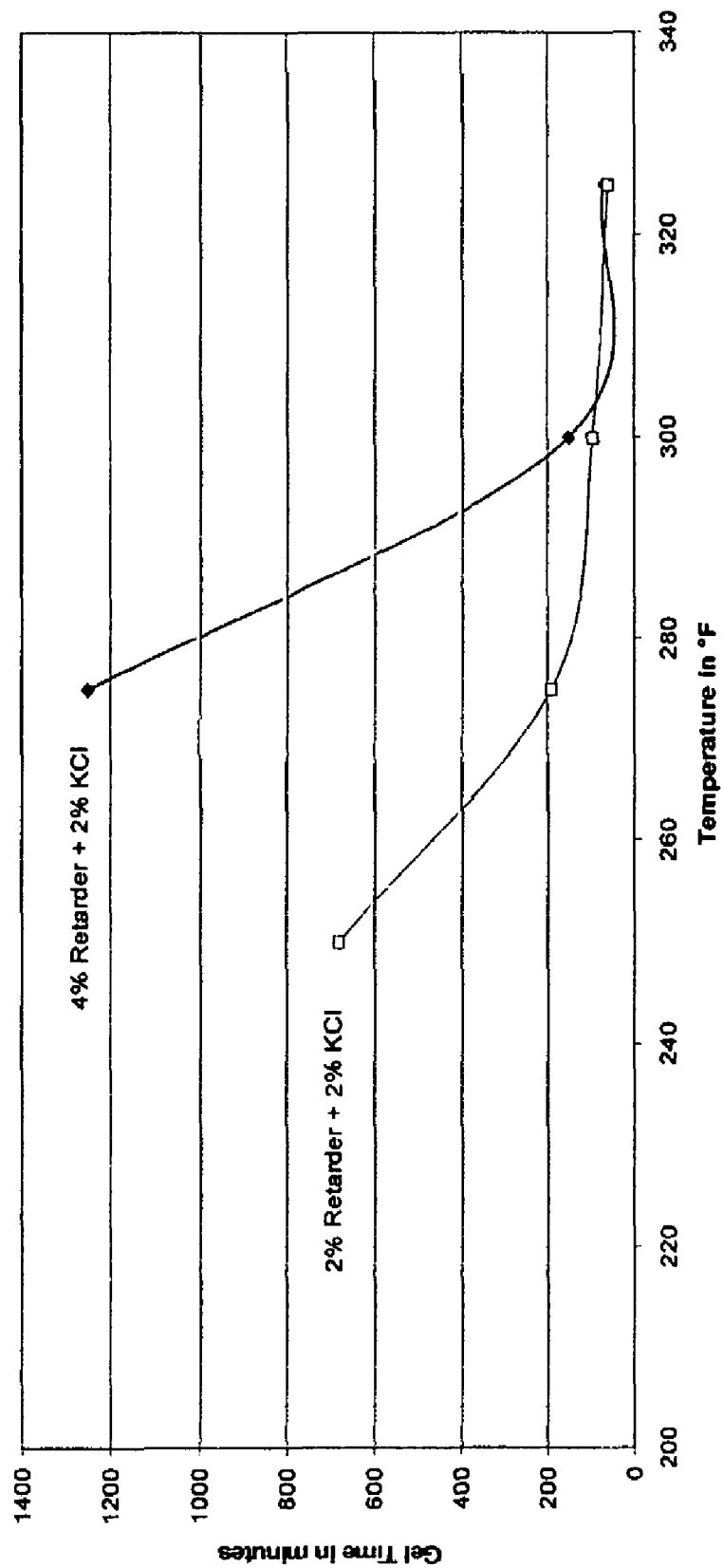
FIG. 3 is a graph of viscosity vs time for an aqueous polymer composition of this invention containing various amounts of polyaspartic acid gel retarder at different temperatures.

A further series of tests were performed over a range of temperatures in which different quantities of a retarder comprising polyaspartic acid was added. The mix water in these tests also contained 2% KCl. The results of the tests are set forth in FIG. 3. The results indicate the retarder is effective over wide temperature ranges in delaying the onset of cross-linking.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of reducing the permeability of a subterranean formation or zone having a temperature above about 200° F. comprising the steps of:
   (a) introducing an aqueous composition into said formation or zone comprised of water, a water soluble organic polymer, an organic gelling agent comprising an amino group for cross-linking said organic polymer wherein said gelling agent is selected from the group consisting of a polyalkyleneimine, a polyfunctional aliphatic amine, an aralkylamine, and a heteroaralkylamine; and a gel retarder comprised of a chemical compound that is capable of acetylating an organic amine and/or hydrolyzing or thermolyzing to produce one or more acids in said composition; and
   (b) allowing said aqueous composition to form a cross-linked gel in said formation or zone.

2. The method of claim 1 wherein said chemical compound of said gel retarder comprises at least one member selected from the group consisting of anhydrides, esters, amides and polyamides, imides, polyacids and their salts.

3. The method of claim 1 wherein said water soluble organic polymer is comprised of a copolymer of an ethylenically unsaturated polar monomer and an ethylenically unsaturated ester.

4. The method of claim 3 wherein said ethylenically unsaturated polar monomer in said copolymer is an amide of an unsaturated carboxylic acid.

5. The method of claim 3 wherein said ethylenically unsaturated polar monomer in said copolymer is acrylamide.

6. The method of claim 3 wherein said ethylenically unsaturated ester in said copolymer is formed of a hydroxyl compound and an ethylenically unsaturated carboxylic acid selected from the group consisting of acrylic acid, methacrylic acid, crotonic acid and cinnamic acid.

7. The method of claim 6 wherein said hydroxyl compound is an alcohol having the formula ROH wherein R is a group selected from alkyl, alkenyl, cycloalkyl, aryl, arylalkyl, a heterocyclic group substituted with one or more groups selected from hydroxyl, ether and thioether, and an aromatic group substituted with one or more groups selected from hydroxyl, ether and thioether.

8. The method of claim 3 wherein said ethylenically unsaturated ester is t-butyl acrylate.

9. The method of claim 1 wherein said organic gelling agent is selected from the group consisting of polyethylene imine, polypropylene imine, polyethylene polyamine, polypropylene polyamine, polyvinylamine, polyallylamine, poly(vinylalcohol/vinylamine), chitosan, a derivative of chitosan, polylysine, polymyxin and combinations there of.

10. The method of claim 1 wherein said water soluble organic polymer is a terpolymer of an ethylenically unsaturated polar monomer, an ethylenically unsaturated ester and a bulky monomer selected from the group consisting of 2-acrylamido-2-methylpropane sulfonic acid, N-vinylpyrrolidone, and N,N-dimethylacrylamide or said water soluble polymer is a tetrapolymer of an ethylenically unsaturated polar monomer, an ethylenically unsaturated ester, 2-acrylamido-2-methylpropane sulfonic acid and a monomer selected from the group consisting of N-vinylpyrrolidone and N,N-dimethylacrylamide.

11. The method of claim 10 wherein said ethylenically unsaturated polar monomer in said terpolymer or tetrapolymer is an amide of an unsaturated carboxylic acid.

12. The method of claim 10 wherein said ethylenically unsaturated polar monomer in said terpolymer or tetrapolymer is acrylamide.

13. The method of claim 10 wherein said ethylenically unsaturated ester in said terpolymer or tetrapolymer is formed of a hydroxyl compound and an ethylenically unsaturated carboxylic acid selected from the group of acrylic acid, methacrylic acid, crotonic acid and cinnamic acid.

14. The method of claim 13 wherein said hydroxyl compound is an alcohol having the formula ROH wherein R is a group selected from alkyl, alkenyl, cycloalkyl, aryl, arylalkyl, a heterocyclic group substituted with one or more groups selected from hydroxyl, ether and thioether, and an aromatic group substituted with one or more groups selected from hydroxyl, ether and thioether.

15. The method of claim 10 wherein said ethylenically unsaturated ester is t-butyl acrylate.

16. The method of claim 1 wherein said organic gelling agent is a chelated organic gelling agent.

17. The method of claim 16 wherein said chelated organic gelling agent is comprised of a metal ion chelated water soluble polyalkyleneimine.

18. The method of claim 17 wherein said polyalkyleneimine is selected from the group consisting of polyethyleneimine and polypropyleneimine.

19. The method of claim 17 wherein said polyalkyleneimine is polyethyleneimine.

20. The method of claim 17 wherein said metal ion is selected from the group consisting of zirconium(IV) ion, cobalt (II or III) ion, nickel (II) ion, ferric ion, titanium (IV ion) and copper (II) ion.

21. The method of claim 17 wherein said metal ion is zirconium ion.

22. A composition for reducing the permeability of a subterranean formation or zone comprising:
water;
a water soluble organic polymer;
an organic gelling agent comprising an amino group for cross-linking said organic polymer wherein said gelling agent is selected from the group consisting of a polyalkyleneimine, a polyfunctional aliphatic amine, an aralkylamine, and a heteroaralkylamine; and
a gel retarder comprising at least one member selected from the group consisting of polysuccinimide, polyaspartic acid, polyglutamic acid and their salts.

23. The composition of claim 22 wherein said gel retarder is comprised of polysuccinimide or polyaspartic acid.

24. The composition of claim 22 wherein said water soluble organic polymer is comprised of a copolymer of an ethylenically unsaturated polar monomer and an ethylenically unsaturated ester.

25. The composition of claim 24 wherein said ethylenically unsaturated polar monomer in said copolymer is an amide of an unsaturated carboxylic acid.

26. The composition of claim 24 wherein said ethylenically unsaturated polar monomer in said copolymer is acrylamide.

27. The composition of claim 24 wherein said ethylenically unsaturated ester in said copolymer is formed of a hydroxyl compound and an ethylenically unsaturated carboxylic acid selected from the group of acrylic acid, methacrylic acid, crotonic acid and cinnamic acid.

28. The composition of claim 27 wherein said hydroxyl compound is an alcohol having the formula ROH wherein R is a group selected from the group consisting of alkyl, alkenyl, cycloalkyl, aryl, arylalkyl, a heterocyclic group substituted with one or more groups selected from hydroxyl, ether and thioether, and an aromatic group substituted with one or more groups selected from hydroxyl, ether and thioether.

29. The composition of claim 24 wherein said ethylenically unsaturated ester is t-butyl acrylate.

30. The composition of claim 22 wherein said organic gelling agent is selected from the group consisting of polyethylene imine, polypropylene imine, polyethylene polyamine, polypropylene polyamine, polyvinylamine, polyallylamine, poly(vinylalcohol/vinylamine), chitosan, a derivative of chitosan, polylysine, polymyxin and combinations there of.

31. The composition of claim 22 wherein said water soluble organic polymer is a terpolymer of an ethylenically unsaturated polar monomer, an ethylenically unsaturated ester and a bulky monomer selected from the group consisting of 2-acrylamido-2-methylpropane sulfonic acid, N-vinylpyrrolidone, and N,N-dimethylacrylamide or said water soluble polymer is a tetrapolymer of an ethylenically unsaturated polar monomer, an ethylenically unsaturated ester, 2-acrylamido-2-methylpropane sulfonic acid and a monomer selected from the group consisting of N-vinylpyrrolidone and N,N-dimethylacrylamide.

32. The composition of claim 31 wherein said ethylenically unsaturated polar monomer in said terpolymer or tetrapolymer is an amide of an unsaturated carboxylic acid.

33. The composition of claim 31 wherein said ethylenically unsaturated polar monomer in said terpolymer or tetrapolymer is acrylamide.

34. The composition of claim 31 wherein said ethylenically unsaturated ester in said terpolymer or tetrapolymer is formed of a hydroxyl compound and an ethylenically unsaturated carboxylic acid selected from the group of acrylic acid, methacrylic acid, crotonic acid and cinnamic acid.

35. The composition of claim 34 wherein said hydroxyl compound is an alcohol having the formula ROH wherein R is a group selected from alkyl, alkenyl, cycloalkyl, aryl, arylalkyl, a heterocyclic group substituted with one or more groups selected from hydroxyl, ether and thioether, and an aromatic group substituted with one or more groups selected from hydroxyl, ether and thioether.

36. The composition of claim 31 wherein said ethylenically unsaturated ester is t-butyl acrylate.

37. The composition of claim 22 wherein said organic gelling agent is a chelated organic gelling agent.

38. The composition of claim 37 wherein said chelated organic gelling agent is comprised of a metal ion chelated water soluble polyalkyleneimine.

39. The composition of claim 38 wherein said polyalkyleneimine is selected from the group consisting of polyethyleneimine and polypropyleneimine.

40. The composition of claim 38 wherein said polyalkyleneimine is polyethyleneimine.

41. The composition of claim 38 wherein said metal ion is selected from the group of zirconium ion, cobalt ion, nickel ion, ferric ion, titanium IV ion and copper ion.

42. The composition of claim 38 wherein said metal ion is zirconium ion.

43. The method of claim 1 wherein said chemical compound of said gel retarder comprises at least one member selected from the group consisting of polysuccinimide, polyaspartic acid, polyglutamic acid and their salts.

* * * * *